United States Patent [19]

Power et al.

[11] 4,178,201
[45] Dec. 11, 1979

[54] CARRIER FOR HOLDING SHEETS OF MATERIAL FOR USE WITH A THERMAL BINDING MACHINE

[75] Inventors: John J. Power, Westbury, N.Y.; Raymond H. Van Wagener, Darien, Conn.; Ernest M. Raasch, Fort Lee, N.J.

[73] Assignee: Swingline, Inc., Long Island City, N.Y.

[21] Appl. No.: 680,686

[22] Filed: Apr. 27, 1976

[51] Int. Cl.² .......................... B32B 35/00; C09J 5/00
[52] U.S. Cl. ..................................... 156/499; 11/1 R; 11/1 AD; 281/21 R
[58] Field of Search ............... 156/381, 499, 477 B, 156/538; 11/1 AD, 2, 3, 5, 1 R; 281/21 R, 28

[56] References Cited
U.S. PATENT DOCUMENTS

| | | | |
|---|---|---|---|
| 3,531,358 | 9/1970 | Rost et al. | 156/499 |
| 3,707,418 | 12/1972 | Bhagat et al. | 281/21 R |
| 3,717,366 | 2/1973 | Decker | 11/1 R |
| 3,804,694 | 4/1974 | Blair | 11/1 AD |
| 3,888,722 | 6/1975 | Blair et al. | 11/1 AD |
| 3,926,712 | 12/1975 | Wetzler et al. | 281/21 R |
| 3,953,277 | 4/1976 | Kuhns | 11/1 AD |
| 3,956,053 | 5/1976 | Staats | 11/1 AD |

Primary Examiner—Caleb Weston
Attorney, Agent, or Firm—Pennie & Edmonds

[57] ABSTRACT

A carrier for holding sheets of material to be bound along one edge thereof for use in a thermal binding machine. The carrier includes two side portions and a bottom portion which cooperate to support glue material to maintain the edges of the sheets being bound proximate the glue material. The bottom portion defines an inner surface which allows the bound material to be withdrawn from the bottom portion while maintaining the material in a bound disposition.

15 Claims, 14 Drawing Figures

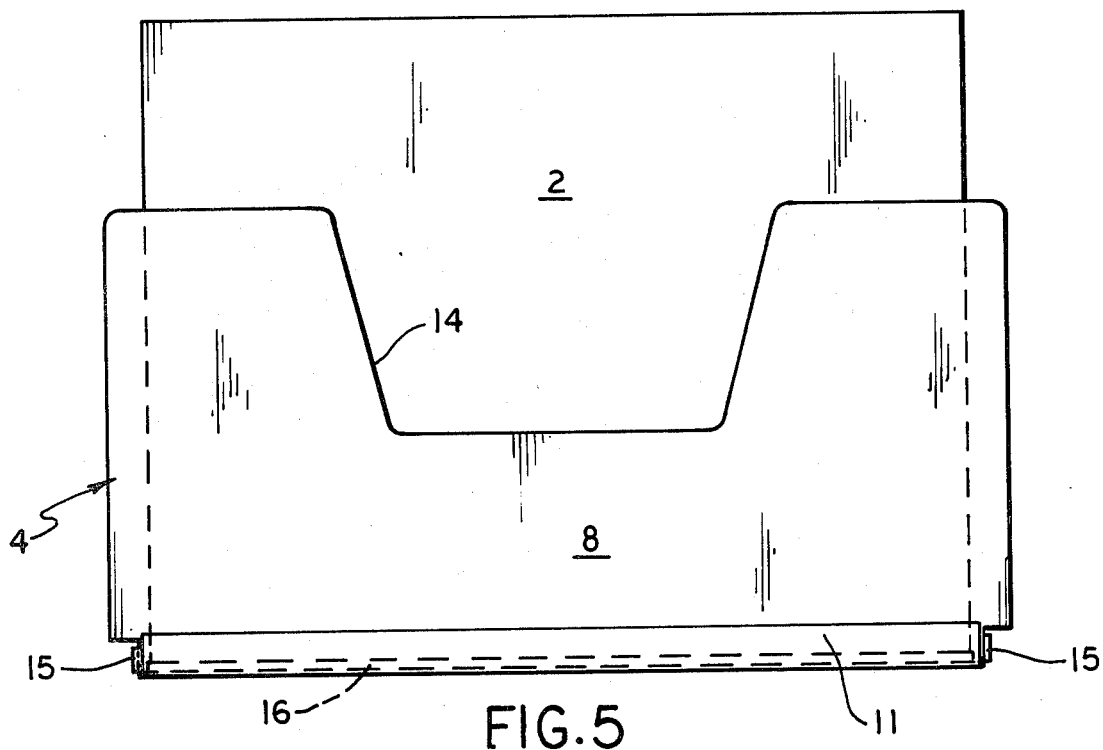
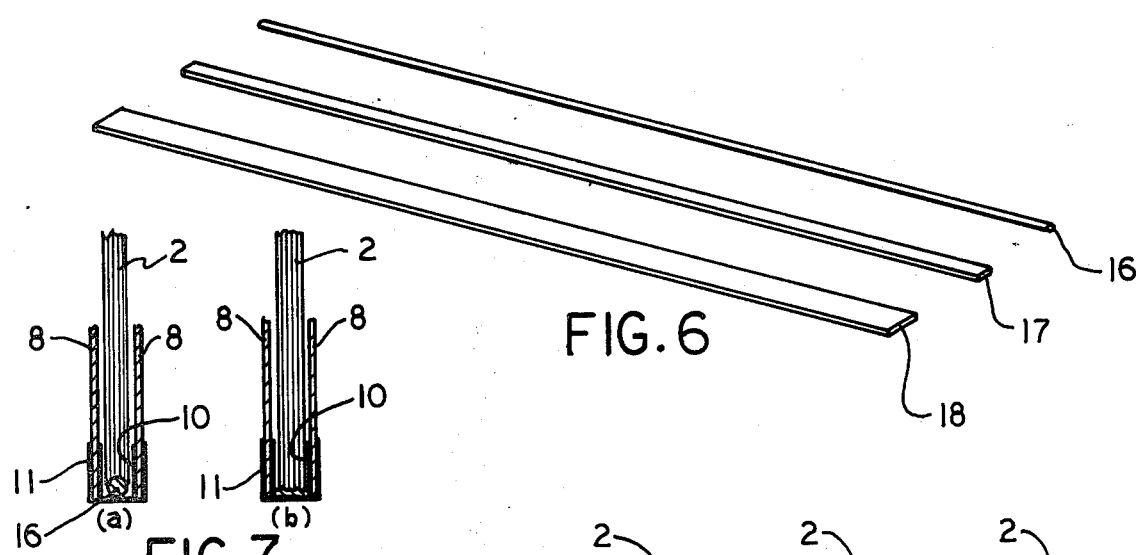
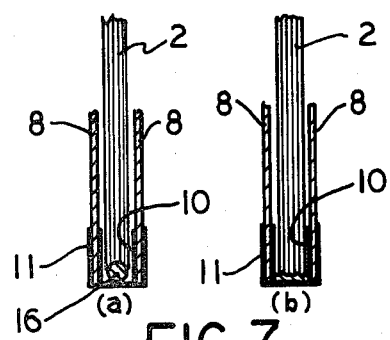
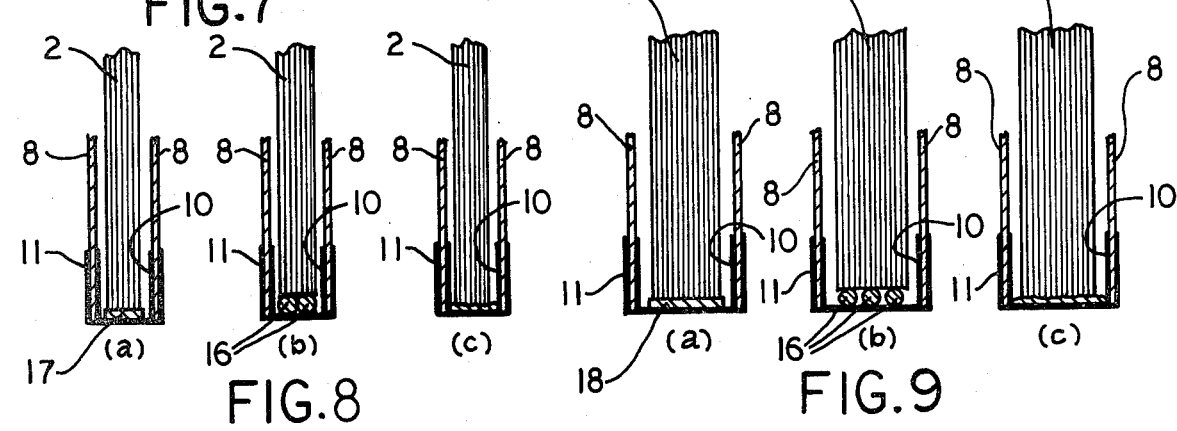

CARRIER FOR HOLDING SHEETS OF MATERIAL FOR USE WITH A THERMAL BINDING MACHINE

BACKGROUND OF THE INVENTION

There are many types of binding machines presently in use employing a hot melt glue process for binding sheets of material together. Typically this process includes a heating device on which the sheet and glue can be placed for melting the glue and utimately binding the sheets together. These machines are normally characterized by the use of a tape on which the glue is placed. The tape is then placed on the edge of the sheets being bound with the glue being intermediate the tape and the edges. This tape, glue and sheet combination is then placed against a heat source for melting the glue and securing the tape on to the sheets, thus producing a bound volume. Another type of machine is one where a cover folder is prepared having a glue material already secured to its spine. With this device the sheets are simply placed with edge being bound along the spine of the folder. The folder is then placed against the heat source for melting the glue and securing the sheets to the spine and the folder thereby binding them together.

The problem with these devices is that additional special material must always be kept on hand to accomplish the binding operation. With the tape device a roll of tape must be readily available in addition to the glue or the binding cannot be accomplished. With regard to the folder they must be used whether a folder is required or not in every binding operation. The use of these machines increases the cost of the binding operation due to the additional materials required and in efficiency of time required by the operator to employ these materials.

SUMMARY OF THE INVENTION

The invention relates to a carrier for holding sheets of material to be bound in a thermal binding machine. The carrier includes at least two side portions and a bottom portion cooperating with the side portions for supporting the glue material and for maintaining the edges of the sheets being bound proximate the glue material. The bottom portion is comprised of a material which allows the bound sheets to be readily withdrawn from the carrier after a binding process has been completed while maintaining the sheets in a bound disposition.

More particularly, the invention relates to a carrier which holds the glue and edges of the sheets for binding while the bottom portion or spine is placed adjacent a heat source. The heat provided by the source melts the glue and precipitates the binding of the edges adjacent the hot melt glue. The carrier comprises two rigid aluminum plates which are secured to one another by a flexible sandwich tape material which forms the bottom portion of the carrier. The sandwich tape material includes an inner tape having end portions secured to each plate and a central portion of a width sufficient to receive a hot melt glue stick. An outer tape is also secured to the plates and has a central portion which corresponds in width to that of the inner tape. The outer tape is made of a material which can withstand the heat necessary to melt the glue and remain flexible enough for repeated opening and closing of the carrier. The inner tape is sufficiently heat resistant to withstand the heat transfer from the outer tape and also provides a surface which allows the bound material to be readily peeled therefrom when removing the bound material from the carrier. In the preferred embodiment three different size carriers are provided for use with the thermal binding machine. These are accompanied by different width glue sticks which correspond to the different size carriers. With the various sizes of carriers and glue sticks a broad range of sheet material can be used with the binding machine and complete binding will be insured.

the sheets to be bound.

FIG. 6 shows three different sizes of glue sticks for use in the carrier. p FIGS. 7a and 7b are cross-sectional views of a carrier with sheets and glue material before and after binding respectively.

FIGS. 8a and 8b show respectively different glue sticks with the sheet material to be bound in a medium size carrier before binding.

FIGS. 9a and 9b show respectively different glue sticks with the sheet material to be bound in a large size carrier before binding.

FIGS. 8c and 9c show the glue material and sheets to be bound after binding in a medium and large carrier respectively.

Figure 10:
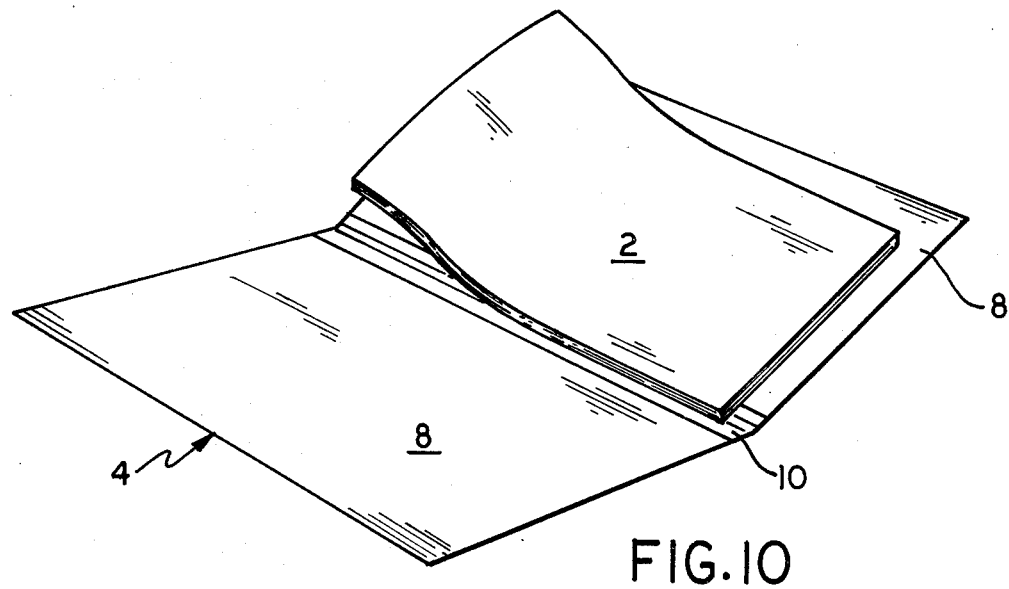

FIG. 10 is a perspective view of a carrier in an open position with the sheets being inserted therein.

Figure 11:
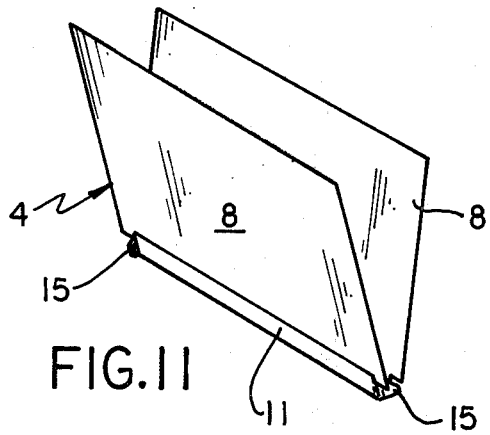

FIG. 11 is a perspective view of a carrier in a partially closed position.

Figure 12:
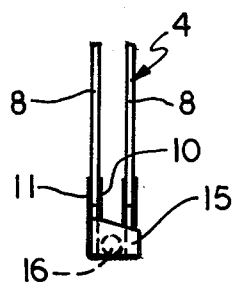

FIG. 12 is an end view of a carrier in a closed position showing tabs extending across the carrier.

Figure 13:
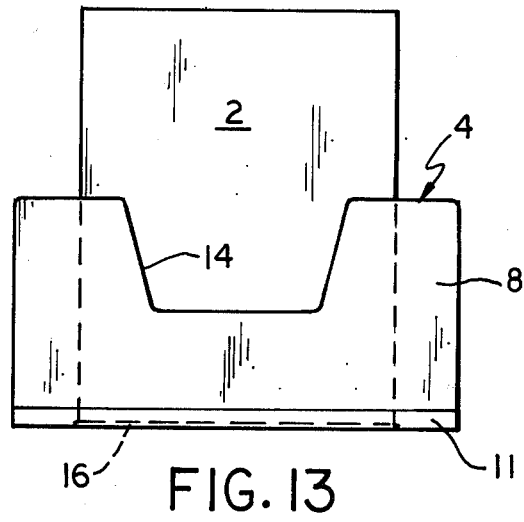

FIG. 13 is an elevated view of a carrier with sheets inserted along the shorter dimension.

Figure 14:
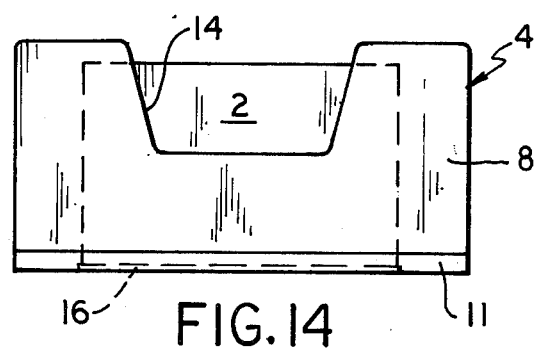

FIG. 14 is an elevated view of a carrier holding sheets of less than the standard size.

DESCRIPTION OF THE PREFERRED EMBODIMENT

Figure 1:
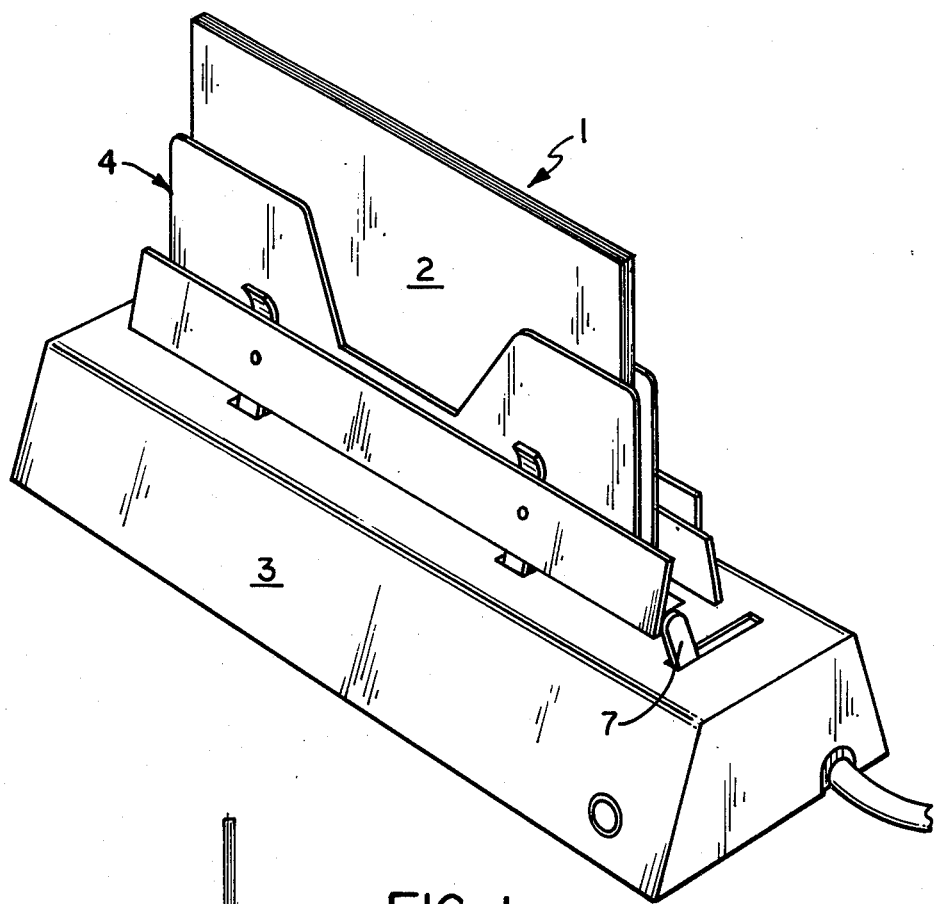
FIG. 1 shows a perspective view of the binding apparatus for binding sheets along one edge.
Figure 2:
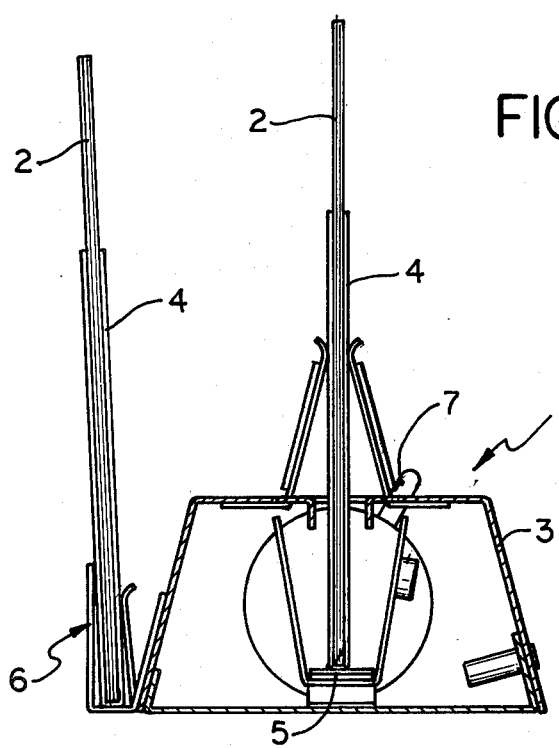
FIG. 2 is a sectional view of the binding machine shown in FIG. 1 with the addition of sheets being held in a bracket adjacent the binding machine.

A binding apparatus 1 having sheets of material 2 supported therein for binding is shown in FIG. 1. This apparatus includes a binding machine 3 provided with means for maintaining a carrier 4 in a predetermined position for heating a portion of the carrier to effect the binding of the sheet material. A hot melt glue is supported in the carrier for binding the sheets together. Sheets 2 are positioned in the carrier 4 so that the edge of the sheets being bound along with the hot melt glue can be placed on a heated source 5 is shown in FIG. 2. The application of heat melts the glue allowing it to flow about the edges of the sheets. After the heat is withdrawn and the carrier and sheets are allowed to cool, the glue hardens thus binding the sheets together. A bracket 6 is secured in the rear of the binding machine for holding the carrier 4 allowing it to cool sufficiently for hardening to complete the binding process.

Figure 3:
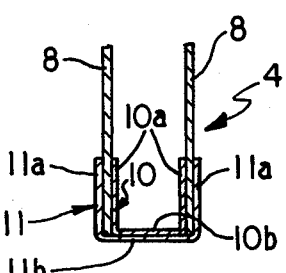
FIG. 3 is a cross-section of a carrier for holding the sheets of material to be bound.

The carrier 4 used in this binding process is more clearly shown in FIGS. 3 and 5. As can be seen in these Figures, the carrier is formed of two generally rectangular plates flexibly secured to one another along the edge portion of the plates. The plates are secured to one another by an inner tape 10 and an outer tape 11 in sandwich configuration. The inner tape 10 is defined by two end portions 10a and a central portion 10b. The end portions 10a are fixedly secured to the inside edge portions of the plates as shown in FIG. 3. The central portion is unsecured with respect to the plates and has a predetermined width slightly greater than the hot melt glue stick used in the binding process. The material used for inner tape 10 is a silicon coated glass reinforced fabric. This particular fabric withstands the heat transferred during melting of the glue and allows the bound sheets to be readily peeled from its surface. To secure the inner tape 10 to the plates a RTV silicon glue is used between the tape and plates.

An outer tape 11, as with the inner tape, has end portions 11a and a central portion 11b. Since the end portions 11a of the outer tape 11 are secured to the outside edges of the plate, the central portion 11b is slightly wider than that of the inner tape to accommodate the thickness of the plates. This outer tape 11 is a material which withstands the heat used in melting the glue when placed adjacent the heat source as shown in FIG. 2. In this embodiment the outer tape is a high temperature tape of the polyimide type known as "KAPTON".

By using flexible tapes described above the plates can be moved relative each other between an open position as shown in FIGS. 10 and 11 and a closed position as shown in FIG. 2. In the open position the plates are pivoted about the bottom portion to expose the inner surface for loading of the glue stick and sheets to be bound. In the closed position the plates are generally parallel to one another as best seen in FIG. 3. After the glue stick and sheets are loaded into the carrier it is moved into the closed position for insertion into the binding machine to effect the binding.

Figure 4:
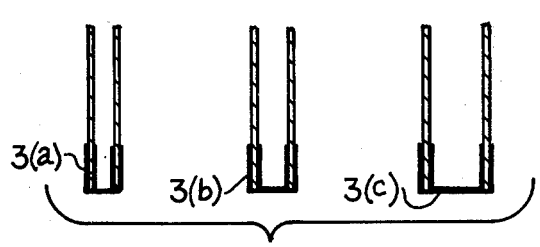
FIG. 4 is a cross-sectional view of three different sizes of carriers which can be used in the binding machine.

A U-shaped portion 14 is cut out from the central area of the sides as can be seen in FIG. 5. With this cut away portion when smaller sheets are used, as shown in FIG. 14, they may be readily grasped for insertion into and withdrawal from the carrier. In addition, the sides have a length which is greater than that of the sheets being bound so that they will not be accidentally jammed out of alignment. The bottom portion of the side members are provided with tabs 15 which extend perpendicularly from one edge of the plate entirely across to the edge of the other plate when the plate is in a position for binding as shown in FIG. 12. By using tabs in this manner, both the glue stick and the sheets will be in proper alignment during the binding process. As can be seen in FIG. 4 several different sizes for the carrier are employed to accommodate various thicknesses of sheets being bound. In this embodiment three carriers are provided although any number could be used. The carriers are dimensioned to receive three differrent sizes of alue sticks shown in FIG. 6. The small glue stick is a cylindrical rod of 1/16" diameter. The rod configuration eliminates any need to orient the glue stick when placed in a carrier. The other glue sticks have a rectangular cross-section with the greater dimensions being 3/16" and ⅜" respectively. The bottom portion of each carrier 4 has a width slightly greater than the glue stick it is dimensioned to receive. Thus, the smaller carrier 3a has a central portion 10a which is slightly greater than 1/16 of an inch so that it may readily accommodate the 1/16" glue stick rod 16 as shown in FIG. 6. A medium size carrier 3b an a large carrier 3c define central portions slightly greater than the 3/16" and ⅜" width for the glue sticks 17 and 18 respectively. By dimensioning the bottom portion in this manner the carrier can easily accommodate its respective glue stick and insure that the sheet edges are all properly aligned with the glue for binding.

An example of the sheet and glue arrangement in the carrier before and after the binding process is shown in FIGS. 7(a), 7(b) respectively. The rod 16 is placed on the bottom portion of the carrier 3a with the sheets to be bound placed on top thereof. After the carrier, glue stick and sheets have been placed in a thermal binder, the glue stick melts and eventually hardens to bind the sheets as shown in FIG. 7 (b). Similarly, the larger width glue sticks 17, 18 are used in connection with the larger carrier 3b and 3c, as shown in FIGS. 8 and 9, to bind a greater number of sheets. With these devices it has been determined that the smaller carrier 3a can readily receive and bind from two to twenty sheets while the medium size carrier 3b will bind from twenty to fifty sheets and the large carrier 3c from fifty to one hundred sheets. Although this range can vary, it has been found that these limits produce good results.

It should also be noted from FIGS. 8(b) and 9(b) that rods 16 can be used in place of the flat glue sticks if they are unavailable. As seen in FIG. 8 two rods 16 can be used to replace glue stick 18 in the medium size carrier and three rods can be used to replace the glue stick 19 in the large carrier.

In operation the size carrier is chosen best on the number of sheets to be bound. The glue stick associated with the size carrier chosen is placed on the bottom portion of the carrier. The sheets are then placed within the carrier with the edges to be bound adjacent the glue stick as shown in FIG. 10. The side portions of the carrier are then moved towards each other for holding the sheets and glue stick in alignment. The carrier with the sheets and glue stick are then placed in the thermal binder as shown in FIG. 2 with the outer surface of the bottom portion lying on top of the heat 5. The lever 7 is then moved to actuate the automatic heating element. The carrier is then subjected to heat for approximately thirty seconds causing the hot melt glue to melt and flow about the edges to be bound. When the thirty second period is passed a light on the binding machine shuts off indicating that the binding process has been completed. The carrier is then withdrawn from the heating element 5 and placed in bracket 6 to cool. After the glue is cooled sufficiently to harden and bind the sheets together, the bound sheets can simply be peeled from the inner surface of the bottom portion without affecting the bind.

With the above described apparatus the sheets can be bound without resorting to costly tape material or special folders. By eliminating the need for a folder the sheets can be bound along either the short or long side of the sheets. In addition unusual size sheets can be bound without the need to align the sheets with a specially configured folder. Otherwise, the sheets would have to correspond to the size of the folders being used and be bound along the side which has a length similar to the spine length of the folder. With the above apparatus no such limitations are imposed. Thus, the subject carrier and binding machine allows versatility and economy in binding since sheets can be bound along any side regardless of the sheet size and without the need for additional materials.

We claim:

1. A carrier for supporting sheets to be bound along one edge of said sheets, said carrier having two side portions and a bottom portion:
   (a) said side portions cooperating with said bottom portion for supporting the edges of the sheets being bound proximate the bottom portion and between the side portion;
   (b) said bottom portion having an inner surface for supporting glue material placed thereagainst and used in binding the sheets together;
   (c) said bottom portion also having an outer surface defined by a material for withstanding the heat when placed adjacent a heat source sufficient to melt the glue material proximate the inner surface; and
   (d) said inner surface including a material for withstanding the heat transferred from the outer surface and having the characteristic of allowing the melted glue after cooling to be withdrawn from the inner surface in bound disposition with the sheets.

2. The carrier according to claim 1 wherein said bottom portion has a flexible member for allowing movement of the side portions relative to each other.

3. The carrier according to claim 2 wherein said glue is a solid material which melts upon the application of heat to bind the sheets together upon cooling.

4. The carrier according to claim 3 wherein said inner surface cooperates with said glue and said sheets for allowing the bound sheets to be withdrawn from the carrier while maintaining the sheets in a bound disposition.

5. The carrier according to claim 4 wherein said side portions are rigid planar members.

6. The carrier according to claim 5 wherein said rigid planar members are formed from aluminum sheet metal.

7. The carrier according to claim 6 wherein said bottom portion is a spine portion formed from tape material, the tape material includes two end portions and a central portion between the end portions, the end portions being secured to the planar members with the central portion being of a sufficient width for receiving the glue material.

8. The carrier according to claim 7 wherein the inner surface of the tape material is defined by a silicon coated glass reinforced fabric and the outer surface being defined by a high temperature tape.

9. The carrier according to claim 8 wherein said high temperature tape is polyimide tape.

10. The carrier according to claim 9 wherein the width of the central portion is slightly greater than the width of the glue material being used.

11. A series of carriers for use with a thermal binding machine wherein each carrier has two side portions and a bottom portion wherein:
   (a) said side portions cooperate with said bottom portion for supporting the edges of the sheets being bound proximate the bottom portion and between the side portions;
   (b) said bottom portion has an inner surface for supporting glue material placed thereagainst and used in binding the sheets together;
   (c) said bottom portion also defining an outer surface defined by a material for withstanding the heat when placed adjacent a heat source sufficient to melt the glue material proximate the inner surface;
   (d) said inner surface including a material for withstanding the heat transferred from the outer surface and having the characteristic of allowing the melted glue after cooling to be withdrawn from the inner surface in a bound disposition with the sheets; and
   (e) the bottom portion being of a predetermined width for receiving a multitude of sheets to be bound and at least one carrier of said series having a bottom portion with a width different from the width of the remaining carriers of said series.

12. The series of carriers according to claim 11 wherein said series is comprised of three carriers with each carrier having a bottom portion defining a width different from the dimension of the width of the bottom portion of the other carriers.

13. The series of carriers according to claim 12 wherein the bottom portion of each carrier has a width slightly greater than the glue stick used in binding the sheeting together.

14. The series of carriers according to claim 13 wherein said carriers are comprised of a first carrier with a bottom portion for receiving a glue stick rod of 1/16" diameter, a second carrier for receiving a glue stick having a width of 3/16" and a third carrier having a bottom portion with a width for receiving a glue stick with a width of ⅜".

15. A binding apparatus for binding sheets together along one edge thereof, said binding apparatus comprising a thermal binding machine having a heat source, a carrier, said binding machine having a support member for supporting the carrier on the heat source, each carrier having two side portions and a bottom portion wherein:
   (a) said side portions cooperate with said bottom portion for supporting the edges of the sheets being bound proximate the bottom portion and between the side portions;
   (b) said bottom portion has an inner surface for supporting glue material placed thereagainst and used in binding the sheets together;
   (c) said bottom portion also defining an outer surface defined by a material for withstanding the heat when placed adjacent a heat source sufficient to melt the glue material proximate the inner surface;
   (d) said inner surface including a material for withstanding the heat transferred from the outer surface and having the characteristic of allowing the melted glue after cooling to be withdrawn from the inner surface in a bound disposition with the sheets; and
   (e) a control means for actuating the heat source for providing sufficient amount of heat to the glue for melting the glue sufficiently to effect binding of the sheets.

* * * * *

UNITED STATES PATENT AND TRADEMARK OFFICE
CERTIFICATE OF CORRECTION

PATENT NO. : 4,178,201
DATED : December 11, 1979
INVENTOR(S) : John J. Power, Raymond H. Van Wagener, Ernest M. Raasch It is certified that error appears in the above-identified patent and that said Letters Patent are hereby corrected as shown below:

Column 1, line 22, "with edge" should read --with the edge--.

Column 2, line 22, "the sheets to be bound" should read --Figure 5 shows an elevated view of the carrier holding the sheets to be bound--.

Column 2, line 24, "p FIGS. 7a and 7b" should read --FIGS. 7a and 7b--.

Column 3, line 58, "alue" should read --glue--.

Column 4, line 41, "heat 5" should read --heater 5--.

Colum 6, line 27, "sheeting" should read --sheets--.

Signed and Sealed this

Seventeenth Day of June 1980

[SEAL]

Attest:

SIDNEY A. DIAMOND

Attesting Officer

Commissioner of Patents and Trademarks